United States Patent [19]

Smith

[11] Patent Number: 4,597,565
[45] Date of Patent: Jul. 1, 1986

[54] TEMPERATURE COMPENSATED GAS SPRING MECHANISM

[75] Inventor: Richard C. Smith, Pittsburgh, Pa.

[73] Assignee: Fichtel & Sachs Industries, Inc., Colmar, Pa.

[21] Appl. No.: 644,498

[22] Filed: Aug. 24, 1984

[51] Int. Cl.$^4$ .............................................. F16F 9/48
[52] U.S. Cl. ................................ 267/64.13; 188/276; 267/120
[58] Field of Search ............... 267/64.13, 64.11, 64.14, 267/24, 64.25, 64.26, 69-74, 113, 120, 121, 124, 8 C, 11 R, 11 A, 12, 13, 15, 21, 22 R, 64.16-64.24, 173, 140.5, 140.1, 140.4; 188/269, 276

[56] References Cited

U.S. PATENT DOCUMENTS

| | | | |
|---|---|---|---|
| 1,064,214 | 6/1913 | Herman | 267/64.25 |
| 1,953,128 | 4/1934 | Peteler | 267/64.25 X |
| 2,333,096 | 11/1943 | Dowty | 267/64.13 X |
| 2,520,944 | 9/1950 | Lynn et al. | 267/11 A |
| 2,723,847 | 11/1955 | Hogan | 267/64.13 |
| 2,882,042 | 4/1959 | Fleckenstein | 267/34 |
| 2,999,680 | 9/1961 | Eiseman, Jr. | 267/64.13 |
| 3,193,875 | 7/1965 | Taylor | 267/64.13 X |
| 3,922,000 | 11/1975 | Pruvot et al. | 267/64.13 X |
| 3,947,004 | 3/1976 | Taylor | 267/64.13 |
| 4,373,707 | 2/1983 | Mölders | 267/64.25 X |
| 4,408,751 | 10/1983 | Dodson et al. | 267/64.25 X |

FOREIGN PATENT DOCUMENTS

| | | |
|---|---|---|
| 913720 | 6/1954 | Fed. Rep. of Germany . |
| 3133839 | 11/1982 | Fed. Rep. of Germany . |
| 54-57077 | 10/1977 | Japan . |
| 657217 | 9/1951 | United Kingdom . |
| 737144 | 9/1955 | United Kingdom . |

Primary Examiner—Douglas C. Butler
Attorney, Agent, or Firm—Brumbaugh, Graves, Donohue & Raymond

[57] ABSTRACT

A temperature compensated gas spring mechanism comprises a main gas spring energized by a pressure source that generates primary forces in excess of the selected design forces for the mechanism and a secondary gas spring energized by a second pressure source that generates forces opposed to those of the main gas spring and of magnitudes approximately equal to the excesses of the primary forces over the selected design forces, thereby a compensate to a substantial extent for changes in the primary pressure due to temperature variations.

4 Claims, 3 Drawing Figures

TEMPERATURE COMPENSATED GAS SPRING MECHANISM

TECHNICAL FIELD

This invention relates to gas springs and, more particularly, to a gas spring mechanism which is automatically compensating so as to operate generally uniformly over a broad temperature range.

BACKGROUND ART

The springs used to support automobile trunk lids, hoods, and the like, especially the hatch-back trunk lid and station wagon tailgates, are often of the gas spring variety. A gas spring is essentially a sealed cylinder containing a gas under high pressure and having a piston rod extending from one end of the cylinder. Typically, nitrogen gas having a pressure of approximately 6900 kPa (1000 psi) is used in the cylinder. The spring force results from the pressure of the gas acting on a cross-sectional area equal to that of the rod within the cylinder and urging the rod outwardly. When the rod is pushed into the cylinder, as when the hatchback trunk lid is closed, the rod displaces a certain volume within the cylinder which was previously occupied by the gas. Since the total volume within the cylinder is fixed, the remaining volume available to the gas decreases, resulting in an increase in the pressure of the gas. Thus, the force acting to move the rod outward increases. In conventional gas springs, a piston-like structure may be attached to the rod inside of the cylinder and used for damping and limiting the extend of motion of the rod. Since the gas pressure is normally equal both sides of the piston, it produces little, if any, force on the rod.

Ideally, the pressure of the gas should be sufficient to generate a force large enough to move the piston rod outwardly from the cylinder and lift the trunk lid or the like to which it is attached. The gas pressure should also be low enough when the rod is completely extended and the trunk lid or the like is raised to enable a person easily to move the rod into the cylinder when the trunk lid is being closed. A drawback arising from the use of a gas spring is that the pressure of any gas in a fixed volume changes as the temperature of the gas changes. For an ideal gas, which nitrogen resembles, the pressure is directly proportional to the absolute temperature of the gas. The change in gas pressure due to change in temperature can cause considerable problems when gas springs are used in automobiles, which commonly are exposed to ambient temperatures ranging from below $-18°$ C. ($0°$ F.) to above $40°$ C. ($100°$ F.).

When the ambient temperature is low, the pressure of the gas inside the cylinder is low, resulting in insufficient force to urge the rod outwardly to lift the weight of the trunk lid or hold it up after it is lifted. When the ambient temperature is high, the pressure of the gas inside the cylinder is high, resulting in a large force urging the rod out of the cylinder, a situation which may cause a trunk lid connected to the rod to be raised undesirably rapidly. Furthermore, when the ambient temperature is high, the gas pressure inside the cylinder is large when the rod is completely extended, making it difficult to move the rod into the cylinder when it is desired to close the trunk lid.

It is an object of the present invention to provide a gas spring mechanism in which the sensitivity of the spring force to temperature variation is reduced to an acceptably low level.

DISCLOSURE OF THE INVENTION

The invention is a temperature compensated gas spring mechanism for applying biasing forces of a selected magnitude to a member tending to move the member in a selected direction. Like all prior art gas spring mechanisms, the invention includes, of course, a gas spring (herein referred to as the "main gas spring") coupled to the member and adapted to apply forces to the member in the selected direction. The invention is characterized in that the main gas spring is energized by a pressure source that applies forces (herein "primary forces") to the member of magnitudes in excess of the selected forces and in that there is a second gas spring coupled to the member and energized by a pressure source to apply forces to the member in a direction opposed to those applied by the main gas spring and of magnitudes approximately equal to the excesses of the primary forces over the selected forces and at least partly compensating for changes in the pressure of the pressure source of the main gas spring due to temperature variations.

The primary pressure source is preferably a pressurized primary gas, such as nitrogen gas, the pressure of which varies essentially proportionally with absolute temperature and which remains in the gas phase over the temperature range to which the gas spring is exposed. A desirable temperature range is $-30°$ C. to $80°$ C.

The secondary pressure source is preferably the vapor pressure of a two-phase system in which the liquid and vapor phases are in equilibrium over the temperature range of $-30°$ C. to $80°$ C. Such vapor pressure varies approximately exponentially with absolute temperature. Suitable two-phase systems include acetylene, ethane, FREON-12, FREON-13, FREON-114, propane, propadiene, perfluoropropane, dimethyl ether, N-butane, ammonia, hydrogen bromide, and hydrogen iodide. The secondary pressure source may also be a two-phase system in which the liquid and vapor phases remain in equilibrium over a substantial portion, though not all, of the temperature range of $-30°$ C. to $80°$ C., such as sulfur hexafluoride.

DESCRIPTION OF EMBODIMENTS

Figure 1:
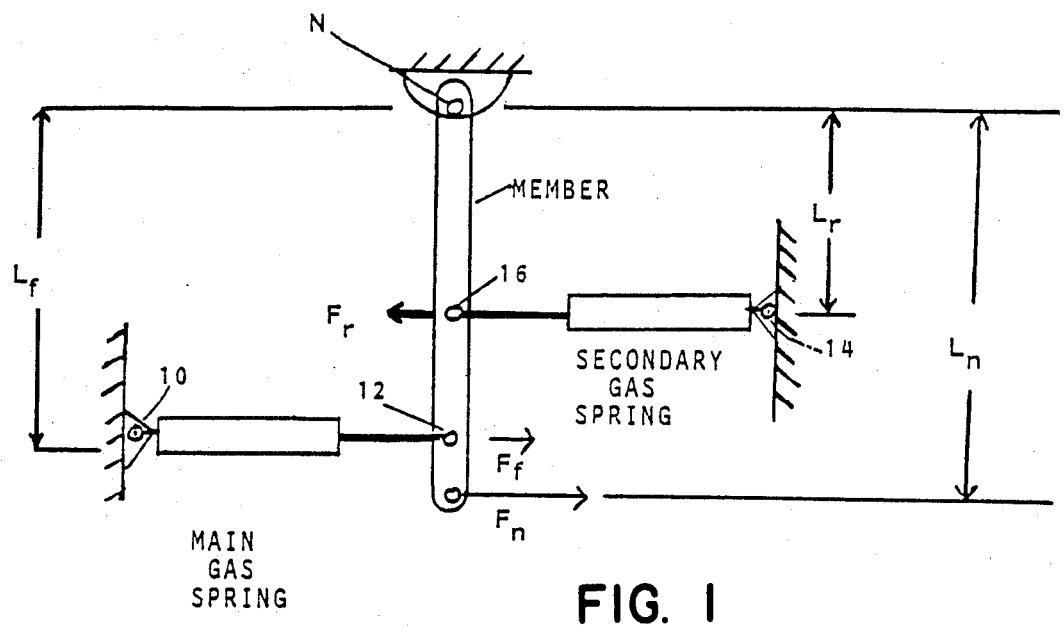
FIG. 1 is a diagrammatic representation of the invention.

FIG. 1 illustrates the invention as used to apply a net force $F_n$ to a member pivoted about fixed pivot point N. The lever will, in turn, be suitably coupled to some object (not shown) to be moved by the force $F_n$. The present invention can be used in conjunction with mechanical linkages of all sorts as well as for direct application of forces to a member without linkages, and FIG. 1 is merely illustrative of a simple form of the mechanism and is not intended to limit the invention to a lever system.

The casing of a main gas spring is attached by a pivot mounting 10 to a fixed support, and the rod of the main gas spring is attached by a pivot coupling 12 to the lever for application of primary forces $F_f$ (forward forces) to the lever at a moment distance $L_f$ from the pivot axis. The casing of a secondary gas spring is fastened by a pivot mounting 14 to a fixed support, and the rod applies secondary forces $F_r$ (reverse forces) to the lever through a pivot coupling 16 at a moment distance $L_r$ from the pivot axis. The net force $F_n$ applied to the lever by the mechanism is, of course, a function of the torques applied to the lever by the two gas springs and the moment distance $L_n$ of the point of transfer of the net forces $F_n$. Because a gas spring inherently produces variable forces due to variations of the working volume of the casing and because the angle relative to the lever of the forces applied by the spring changes as the rod moves in or out, the force $F_n$ varies with the angular position of the lever. In this description, the effects of the variations in the working volumes of the gas springs and the changes in the moment distances will generally be ignored, inasmuch as they are well understood by those skilled in the art and are readily calculated.

The net torque $T_n$ applied to the lever is given by:

$$T_n = F_f \times L_f - F_r \times L_r \qquad (1)$$

The two forces are given by:

$$F_f = A_f \times P_f, \text{ and} \qquad (2)$$

$$F_r = A_r \times P_r \qquad (3)$$

where $A_f$ and $A_r$ are the cross-sectional areas of the rods of the main and secondary gas springs, respectively, and $P_f$ and $P_r$ are the pressures in the respective gas springs.

From the perfect gas law $P_f$ is given approximately by:

$$P_f = P_o(T+273)/293 \qquad (4)$$

where $P_o$ is the initial gas fill pressure of the main gas spring at a temperature T of 20° C.

$P_r$ is the temperature dependent pressure of the material in the secondary gas spring and is the vapor pressure of the material at the temperature of the material, which is determined from readily available handbooks. The design of the secondary pressure source is covered in detail below. A preferred primary gas is nitrogen gas, which behaves essentially according to the ideal gas law (PV=nRT) over the temperature range of −30° C. to 80° C. (It is recognized in the art that no gas will perform exactly in accordance with the theoretical ideal gas law.) Other gases that may be used include argon, helium, hydrogen, krypton, and neon.

The reduction of temperature sensitivity in a gas spring mechanism is accomplished, according to the invention, by providing a reverse force from the secondary pressure source in the secondary gas spring which tends to cancel out the extra force from the main gas spring due to increases in temperature. The secondary pressure is chosen to behave quite differently from the essentially perfect gas behavior of the primary gas. In one aspect of the invention, the secondary pressure source is the vapor pressure of a two-phase system in which the liquid and vapor phases are in equilibrium. The vapor pressure of such a two-phase system varies approximately exponentially with absolute temperature rather than directly proportionally. The main requirement of any secondary pressure source selected is that the percent change of secondary pressure with temperature be greater than the percent change of the primary pressure with temperature.

There are many organic and inorganic substances that can serve as a secondary pressure source, including acetylene, ethane, FREON-12, FREON-13, FREON-114, propane, propadiene, perfluoropropane, dimethyl ether, N-butane, ammonia, hydrogen bromide, and hydrogen iodide. The vapor pressures of these substances range from about 0 to 1000 kPa (0 to 150 psi) psi at a temperature of about −30° C. to about 700 kPa (100 psi) to over 6000 kPa (900 psi) at 70° C. In a two-phase system, for a given substance, the pressure exerted by its vapor will depend only on temperature. The best substance to use in a given application is determined by design requirements for the application, such as spring force, spring size, material cost, manufacturing cost, seal lifetime, and degree of temperature compensation desired.

It is not absolutely necessary that the secondary pressure be generated by a two-phase system. Indeed, in the example described in detail hereinafter, sulfur hexafluoride is the secondary pressure source. Above a critical temperature, sulfur hexafluoride cannot exist as a two-phase system, but exists solely as a vapor with no liquid phase present. However, temperature compensation is achieved even above the critical temperature because the percent change of the sulfur hexafluoride vapor pressure (i.e., the secondary pressure) with temperature will still be greater than the percent change of a perfect gas pressure with temperature.

Since a substance will remain in a two-phase system with its vapor and liquid phases in equilibrium only for certain ranges of specific volume, a requirement is placed on the volume available for the substance in the secondary gas spring. In general, it is desired that both the liquid and vapor phases always be present so that the vapor pressure will depend only on temperature. As the secondary gas spring is released, i.e., as the rod is moved out of the casing, the working volume available for the two-phase system is increased. If initially there is an insufficient amount of the liquid phase of the substance in the spring, such an increase of the total available volume could cause all of the liquid to convert to vapor. The pressure of this vapor will in general vary with the temperature in a fashion similar to other gases and thus provide little, if any, temperature compensation after all of the substance is vaporized. However, if too much of the substance is used, a problem arises when the spring is compressed (rod moved in), thus reducing the volume available for the substance. This reduction in volume could cause all of the vapor phase to condense, forcing the substance entirely into the liquid phase. This would effectively prevent the rod from moving in beyond a certain point.

To avoid these possible problems with a two-phase system used as a secondary pressure source, the following requirements must be met: (1) the minimum amount of the substance necessary is that which is just sufficient to provide a two-phase system when the secondary gas spring is fully released, i.e., when the available volume is the greatest, at the highest temperature to which the gas spring may be exposed, and (2) the volume available for the substance should be sufficiently large so that the vapor does not entirely condense into liquid when the gas spring is fully compressed, i.e., when the available volume is the smallest. The limiting environment for this second requirement is also the highest temperature to which the gas spring may be exposed.

A study of the examples described below will aid in obtaining a more complete understanding of the invention.

EXAMPLE 1

In this example the mechanism of FIG. 1 is designed for the use of nitrogen gas as the primary pressure source (the main gas spring) and ammonia as the two-phase system for the secondary pressure source (the secondary gas spring). For simplification, it is assumed that the moment distances of the main and secondary gas springs and the net output force are equal. Accordingly, only the applicable forces need be considered in the design. The relationship between the various parameters involved in the gas spring mechanism can be described algebraically using the following terms:

$A_f$ = area of the rod on which the nitrogen gas pressure acts
$A_r$ = area of the rod on which the ammonia vapor pressure acts
$D_f$ = diameter of the main spring rod
$D_r$ = diameter of the secondary spring rod
$F_n$ = net force of the mechanism
$P_f$ = pressure of the nitrogen gas
$P_r$ = pressure of the ammonia vapor
$P_o$ = nitrogen gas pressure at 20° C.
T = temperature (° C.)

The net force of the mechanism, $F_n$, is determined by subtracting the force of the secondary spring due to the ammonia vapor from the force of the main spring due to the nitrogen gas. The equation for calculating $F_n$, ignoring the force of atmospheric pressure on the rods, is:

$$F_n = A_f P_f - A_r P_r \quad (5)$$

The pressure of the nitrogen gas is reasonably well represented by:

$$P_f = \frac{(T + 273)P_o}{293} \quad (6)$$

For this example, it is assumed that the desired net force $F_n$ is 445N (100 lbf) at the temperature extremes of −30° C. and 70° C. The vapor pressure of ammonia in a two-phase system can be determined from standard and well-known handbooks such as *Chemical Engineers Handbook*, edited by John H. Perry (McGraw-Hill, 1950, 3d Edition). At −30° C. the vapor pressure of ammonia is 138 kPa (20 psi), and at 70° C. the vapor pressure is 3275 kPa (475 psi). By inserting these values, the desired $F_n$=445N, and equation 6 into equation 5, the following equations are obtained:

$$445 = \frac{A_f(-30 + 273)P_o}{293} - 138 A_r \quad (7)$$

$$445 = \frac{A_f(70 + 273)P_o}{293} - 3275 A_r \quad (8)$$

Solving equations 7 and 8 simultaneously yields:

$$A_r = 0.594 \text{ cm}^2 (0.0921 \text{ in.}^2) \quad (9)$$

$$A_f P_o = 547 \text{N} (122.80 \text{ lbf}) \quad (10)$$

Using equation 10 above and assuming a typical rod diameter for a gas spring of 10 mm. (0.394 in.), which provides an area $A_f$ of 0.787 cm² (0.122 in.²), the necessary fill pressure, $P_o$, for the nitrogen gas at 20° C. is 6970 kPa (1009 psi).

The design of the mechanism in this example comprises, then, a main gas spring having nitrogen gas at 6970 kPa (1009 psi) at 20° C. and a 10 mm. rod diameter and a secondary gas spring containing an amount of ammonia such that the liquid and vapor phases will remain in equilibrium and having a rod diameter of 8.70 mm. (0.342 in.). Table 1 immediately below sets forth $P_f$ (from equation 6), $F_f$, $P_r$, $F_r$, and $F_n$ for this design over a range of temperatures.

TABLE 1

| T (°C.) | $P_f$ (kPa) | $P_r$ (kPa) | $F_f$ (N) | $F_r$ (N) | $F_n$ (N) |
|---|---|---|---|---|---|
| −30 | 5780 | 138 | 454 | 8.2 | 446 |
| 0 | 6494 | 448 | 510 | 27 | 483 |
| 20 | 6970 | 862 | 547 | 51 | 497 |
| 50 | 7683 | 2027 | 603 | 120 | 483 |
| 70 | 8159 | 3275 | 641 | 195 | 446 |

| T (°C.) | $P_f$ (psi) | $P_r$ (psi) | $F_f$ (lbf) | $F_r$ (lbf) | $F_n$ (lbf) |
|---|---|---|---|---|---|
| −30 | 837 | 20 | 101.8 | 1.8 | 100.0 |
| 0 | 940 | 65 | 114.4 | 6.0 | 108.4 |
| 20 | 1009 | 125 | 122.8 | 11.5 | 111.3 |
| 50 | 1112 | 294 | 135.4 | 27.1 | 108.3 |
| 70 | 1181 | 475 | 143.8 | 43.7 | 100.0 |

The above results show that this mechanism has a maximum force of about 495N (111.3 lbf) at about 20° C. and a minimum force of about 445N (100 lbf) at the temperature extremes. The temperature compensation of the gas spring mechanism of Example 1 can be compared with the use of nitrogen gas alone by comparing the maximum and mimimum spring forces developed with the force at 20° C. being the standard. The deviation is about 10% for the gas spring mechanism of Example 1, while the deviation is about 34% for a gas spring using nitrogen gas alone. It can be appreciated that the gas spring mechanism of the present invention considerably reduces the variation of spring force with temperature as compared with the use of single gas spring with nitrogen gas alone.

EXAMPLE 2

Figure 2:
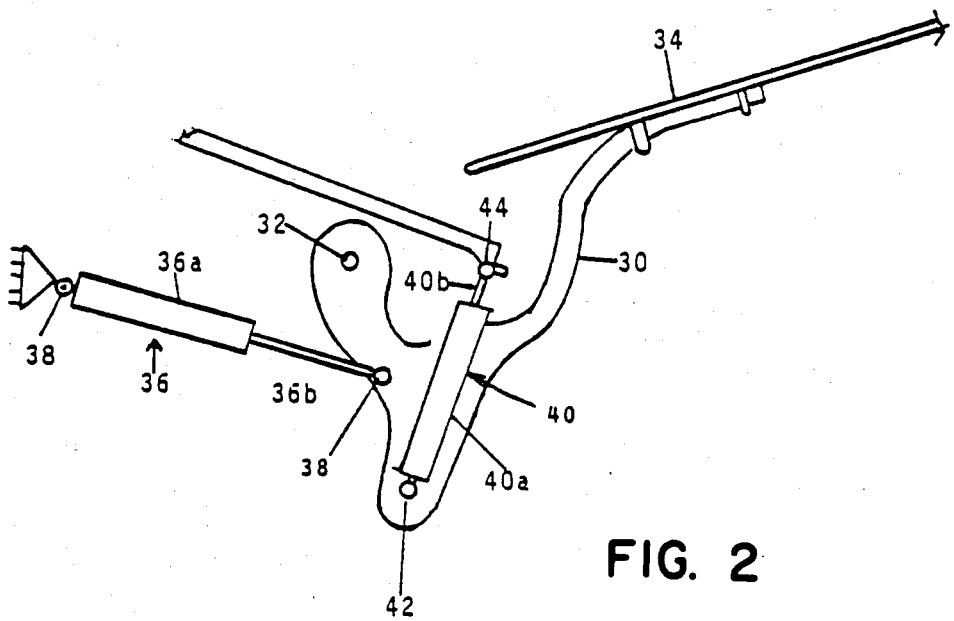
FIG. 2 is a generally schematic side elevational view of the invention as utilized for lifting a trunk lid.

In Example 1, the rod diameter of the main gas spring was assumed, and the rod diameter of the secondary gas spring and the fill pressure of the main gas spring were calculated based on the premise that the net forces of the mechanism would equal the selected design value at the selected low and high temperature extremes. A simpler approach to the design is to select standard rod sizes for the two springs at the outset. This has the advantage of permitting standard gas springs to be used for the mechanism. In this example, it is desired to provide a mechanism for lifting a trunk lid, as shown generally schematically in FIG. 2. The mechanism comprises a lever member 30 that is attached to the vehicle by a pivot mounting 32 and supports the trunk lid 34. The casing 36a of a main gas spring 36 is attached by ball joint 38 to the vehicle body, and the rod 36b is connected by a ball joint 38 to the lever member 30. The casing 40a of a secondary gas spring 40 is attached by a ball joint 42 to the lever member. The rod 40b is attached to the vehicle body by a ball joint 44.

For a selected position of the mechanism it is desired to have the mechanism provide a net torque $T_n$ on the lever member of 45.2N-m (400 in.-lbf) at 20° C. The following parameters are chosen or calculated (as the case may be):

$D_f$ = assumed rod diameter of main gas spring
  = 8 mm (0.315 in.)
$A_f$ = calculated rod area of main gas spring
  = 50.27 mm$^2$ (0.0779 in.$^2$)
$D_r$ = assumed rod diameter of secondary gas spring
  = 10 mm (0.394 in.)
$A_r$ = calculated rod area of secondary gas spring
  = 78.54 mm$^2$ (0.1217 in.$^2$)
$L_f$ = assumed lever arm of main gas spring
  = 10.16 cm (4.0 in.)
$L_r$ = assumed lever arm of secondary gas spring
  = 7.11 cm (2.80 in.)

Equation (1) above written (in U.S. units) for this design is:

$$400 = F_f(4.0) - F_r(2.80),$$

and from equations (2) and (3) can be rewritten as:

$$400 = 4.0 (0.0779) P_f - 2.8 (0.1217) P_r.$$

$P_r$ is the vapor pressure of the substance in the secondary gas spring, which is selected to be sulfur hexafluoride.

Figure 3:
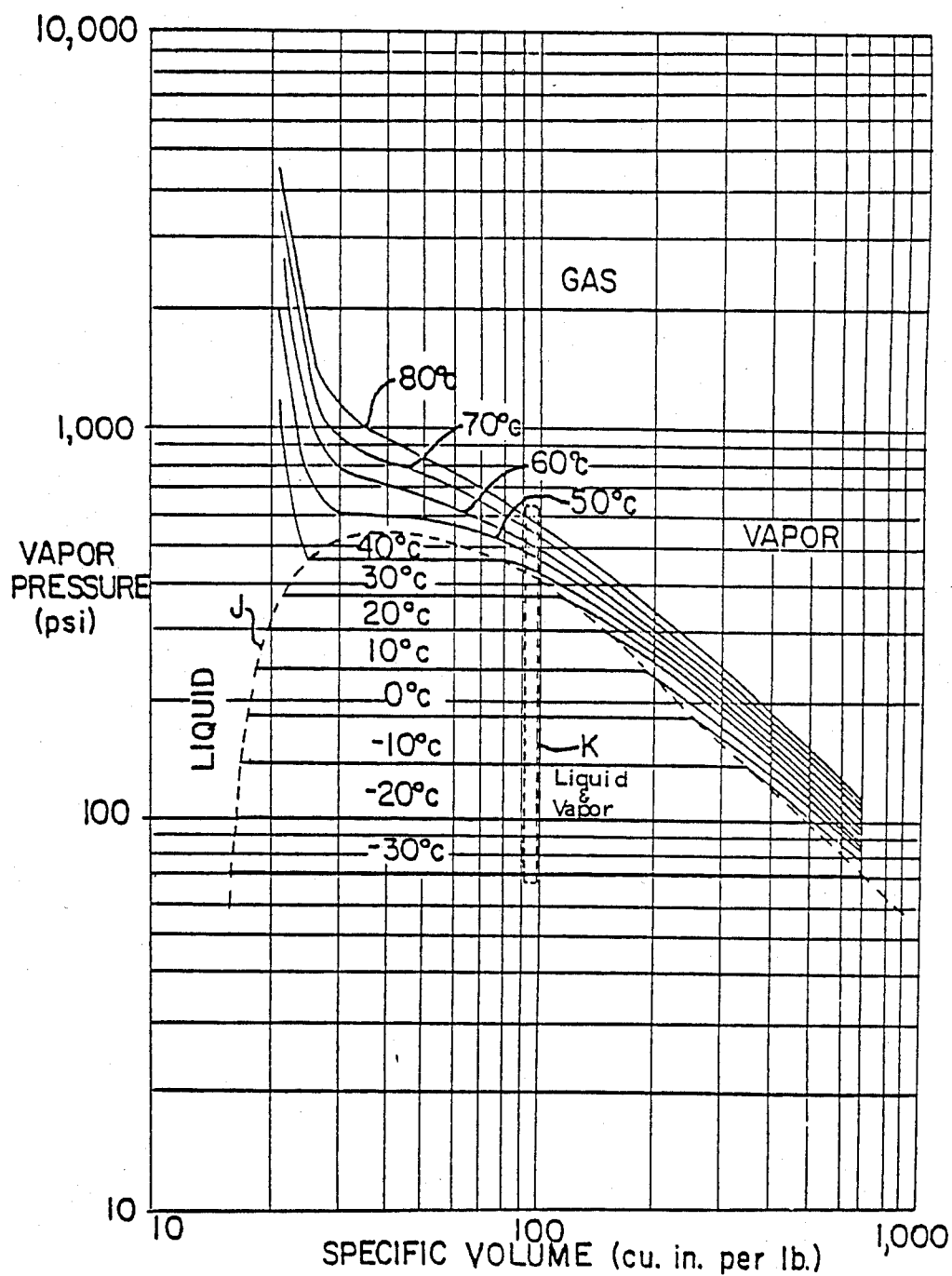
FIG. 3 is a log-log graph of the phase diagram for sulfur hexafluoride showing the vapor pressure as a function of specific volume at several temperatures.

FIG. 3 is a phase diagram of sulfur hexafluoride, in which vapor pressure is plotted as a function of specific volume. There are twelve solid curves representing the temperatures over which the secondary gas spring is to function. The dotted line curve "J" shows the region inside of which the liquid and vapor are in equilibrium. It is desirable to design the secondary spring with a minimum volumetric change between the fully compressed and fully extended limit positions of the rod in order to minimize the variations in $F_r$ due to a varying volume at the higher temperature levels where liquid and vapor are not in equilibrium (i.e., outside the region "J"). The specific volume range represented by the region K is preferred, this range being from about 90 to about 100 cu. in. per lb.(mass). (The specific volume is the volume occupied by the substance divided by the mass of the substance.) It is beyond the scope of this example to design the secondary gas spring in terms of stroke and volume—such design is well within the ordinary level of skill in the art.

It will be observed that this example uses a substance in the secondary gas spring that does not exist in the liquid state at the higher levels of temperature (above about 40° C.) within the operatign range. Sulfur hexafluoride is, nonetheless, a suitable substance, because the percent change in pressure of the vapor with temperature is greater than that of the primary pressure source, nitrogen.

Substituting the value of $P_r$ at 20° C. in the last equation yields the value of $P_f$ at 20° C., i.e. $P_o$, which is the fill pressure of the main gas spring. $P_f$ for the range of operating temperatures can be calculated from equation (6) above, and the values of $T_f$ and $T_r$ easily follow from equations (2) and (3), as set forth in Table 2 immediately below.

TABLE 1

| Temp. (°C.) | U.S. Units | | Net Torque (in.-lb.) |
| --- | --- | --- | --- |
| | $P_f$ (psi) | $P_r$ (psi) | |
| −30 | 1358 | 10 | 399 |
| 0 | 1508 | 181 | 408 |
| 20 | 1618 | 304 | 400 |
| 50 | 1783 | 490 | 387 |

TABLE 1-continued

| Temp. (°C.) | U.S. Units | | Net Torque (in.-lb.) |
| --- | --- | --- | --- |
| | $P_f$ (psi) | $P_r$ (psi) | |
| 80 | 1950 | 608 | 399 |

The above results show that this mechanism has a maximum torque of about 408 in.-lb. at about 0° C. and a minimum torque of about 387 in.-lb. at about 50° C. The temperature compensation of the gas spring mechanism of Example 2 can be compared with the use of nitrogen gas alone by comparing the maximum and minimum torque values with the torque at 20° C. being standard. For nitrogen alone, which behaves essentially like a perfect gas, the percentage variation in torque with temperature is independent of the fill pressure, since the torque is proportioned to the primary force, which is in turn proportioned to the absolute temperature. Accordingly, the nitrogen-alone percent variation is $(1950 - 1358) \times 100/1618 = 36.6\%$. For the mechanism of Example 2, using the computed extreme values of torque, one computes $(408 - 387) \times 100/400 = 5.25\%$. Thus, the sensitivity to temperature is reduced by about a factor of 7.

I claim:

1. In a gas spring mechanism for applying biasing forces of selected magnitudes to a movable member tending to move it in a selected direction and having a main gas spring, including a first cylinder member and a first piston rod member, energized by a pressurized gas within said first cylinder and coupled, by one of said first cylinder and first piston rod members, to the movable member to apply primary forces to the movable member in the selected direction, the improvement wherein the pressurized gas is adapted to generate forces in the main gas spring of magnitudes in excess of the selected forces, said pressurized gas being characterized by (1) a first change in pressure with temperature and (2) a change of pressure with volume such that the primary forces vary with the displacement of the first piston rod relative to the first cylinder member, and in that there is a secondary gas spring, including a second cylinder member and a second piston rod member, energized by a two-phase vapor-liquid system having a vapor pressure characterized by a second percent change in pressure with temperature at temperatures below the critical temperature of said system, and coupled to the movable member by one of said second cylinder and piston rod members to apply forces to it in a direction opposite to the selected direction, said two-phase system being adapted to generate forces in the secondary gas spring of magnitudes approximately equal to the excesses of the primary forces over the selected forces and said second percent change of pressure with temperature being greater than said first percent change of pressure with temperature, thereby at least partly to compensate for changes in the pressure of said pressurized gas due to temperature variations.

2. The improvement according to claim 1 wherein said pressurized gas is a gas having a pressure that varies essentially proportionately with absolute temperature and the vapor pressure of said two-phase system has a pressure that varies approximately exponentially with absolute temperature.

3. The improvement according to claim 2 wherein the liquid and vapor phases of said two-phase system co-exist in equilibrium over a substantial part of the operating temperatures that the mechanism is normally exposed to.

4. The improvement according to claim 3 wherein the two-phase system is selected from the group consisting of acetylene, ethane, FREON-12, FREON-13, FREON-114, propane propadiene, perfluoropropane, dimethyl ether, N-butane, ammonia, hydrogen bromide, hydrogen iodide, and sulfur hexafluoride.

* * * * *